US012725728B2

(12) United States Patent
Koyama et al.

(10) Patent No.: US 12,725,728 B2
(45) Date of Patent: Sep. 1, 2026

(54) INDUCTOR

(71) Applicant: Panasonic Intellectual Property Management Co., Ltd., Osaka (JP)

(72) Inventors: Ken Koyama, Hyogo (JP); Takashi Inoue, Hyogo (JP); Satoru Shimomura, Hyogo (JP); Jun Kuroiwa, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 553 days.

(21) Appl. No.: 18/551,198

(22) PCT Filed: Apr. 11, 2022

(86) PCT No.: PCT/JP2022/017530

§ 371 (c)(1),
(2) Date: Sep. 19, 2023

(87) PCT Pub. No.: WO2022/224865

PCT Pub. Date: Oct. 27, 2022

(65) Prior Publication Data

US 2024/0170200 A1 May 23, 2024

(30) Foreign Application Priority Data

Apr. 21, 2021 (JP) ................................ 2021-071503
Aug. 19, 2021 (JP) ................................ 2021-133819

(51) Int. Cl.
*H01F 27/29* (2006.01)
*H01F 27/255* (2006.01)

(52) U.S. Cl.
CPC ........... *H01F 27/29* (2013.01); *H01F 27/255* (2013.01)

(58) Field of Classification Search
CPC ...... H01F 27/29; H01F 27/28; H01F 27/2823; H01F 27/24; H01F 27/00; H01F 27/255; H01F 17/04; H01F 17/048; H01F 41/0246
USPC ................................ 336/177, 192, 218, 255
See application file for complete search history.

(56) References Cited

U.S. PATENT DOCUMENTS

| | | | | |
|---|---|---|---|---|
| 12,119,163 | B2 * | 10/2024 | Oka | H01F 27/306 |
| 12,567,533 | B2 * | 3/2026 | Hanson | H01F 27/2852 |
| 2021/0020356 | A1 | 1/2021 | Oka | |

FOREIGN PATENT DOCUMENTS

| | | |
|---|---|---|
| JP | 2007-150139 | 6/2007 |
| JP | 2010-123864 | 6/2010 |
| JP | 2021-019042 | 2/2021 |

OTHER PUBLICATIONS

International Search Report of PCT application No. PCT/JP2022/017530 dated Jun. 21, 2022.

* cited by examiner

*Primary Examiner* — Hai L Nguyen
(74) *Attorney, Agent, or Firm* — Rimon P.C.

(57) ABSTRACT

An object is to provide a small and highly reliable inductor capable of handling a large current. The inductor includes: magnetic core formed by pressing a mixture of a powdered magnetic material and a binder; coil part disposed inside magnetic core; and external electrode formed by bending end portion of coil part protruding from magnetic core. Coil part and external electrode are made of a flat conductor, and a width of end portion of coil part protruding from magnetic core is less than an average width of coil part disposed inside magnetic core.

5 Claims, 8 Drawing Sheets

INDUCTOR

CROSS-REFERENCE TO RELATED APPLICATIONS

This application is a U.S. national stage application of the PCT International Application No. PCT/JP2022/017530 filed on Apr. 11, 2022, which claims the benefit of foreign priority of Japanese patent application No. 2021-071503 filed on Apr. 21, 2021, and foreign priority of Japanese patent application No. 2021-133819 filed on Aug. 19, 2021, the contents all of which are incorporated herein by reference.

TECHNICAL FIELD

The present disclosure relates to an inductor used in various electronic devices.

BACKGROUND ART

In recent years, since sophistication of electronic devices has demanded downsizing and larger current in use, there has been a demand for inductors that satisfy both of these requirements. To meet the demand, a magnetic core is formed by pressure forming after embedding a coil element punched out from a flat conductor in a powder mixture of a metal magnetic powder and a binder made of a thermosetting resin, and terminals are formed by bending end portions of the coil element protruding from side surfaces of the magnetic core.

Note that, for example, PTL 1 is known to disclose information on prior art documents related to the present disclosure.

CITATION LIST

Patent Literature

PTL 1: Unexamined Japanese Patent Publication No. 2021-19042

SUMMARY OF THE INVENTION

However, it is necessary to increase a width of a flat conductor of portions protruding from the magnetic core in order to increase strength of the terminals. When a thickness of the flat conductor is increased in order to reduce a DC resistance value, a force is applied to the magnetic core while the end portion is bent to form the terminal, which may easily cause a crack or the like.

An object of the present disclosure is to provide a small and highly reliable inductor capable of handling a large current.

In order to solve the above problem, an inductor according to the present disclosure includes: a magnetic core formed by pressing a mixture of a powdered magnetic material and a binder; a coil part disposed inside the magnetic core; and an external electrode formed by bending an end portion of the coil part, the end portion protruding from the magnetic core, the coil part and the external electrode being made of a flat conductor, a width of the end portion of the coil part protruding from the magnetic core being less than an average width of the coil part disposed inside the magnetic core.

The above configuration allows the coil part having the end portions protruding from the magnetic core to be easily bent, and thus can provide a small and highly reliable inductor capable of handling a large current.

DESCRIPTION OF EMBODIMENT

Hereinafter, inductor 100 according to an exemplary embodiment of the present disclosure will be described with reference to the drawings.

Figure 1:
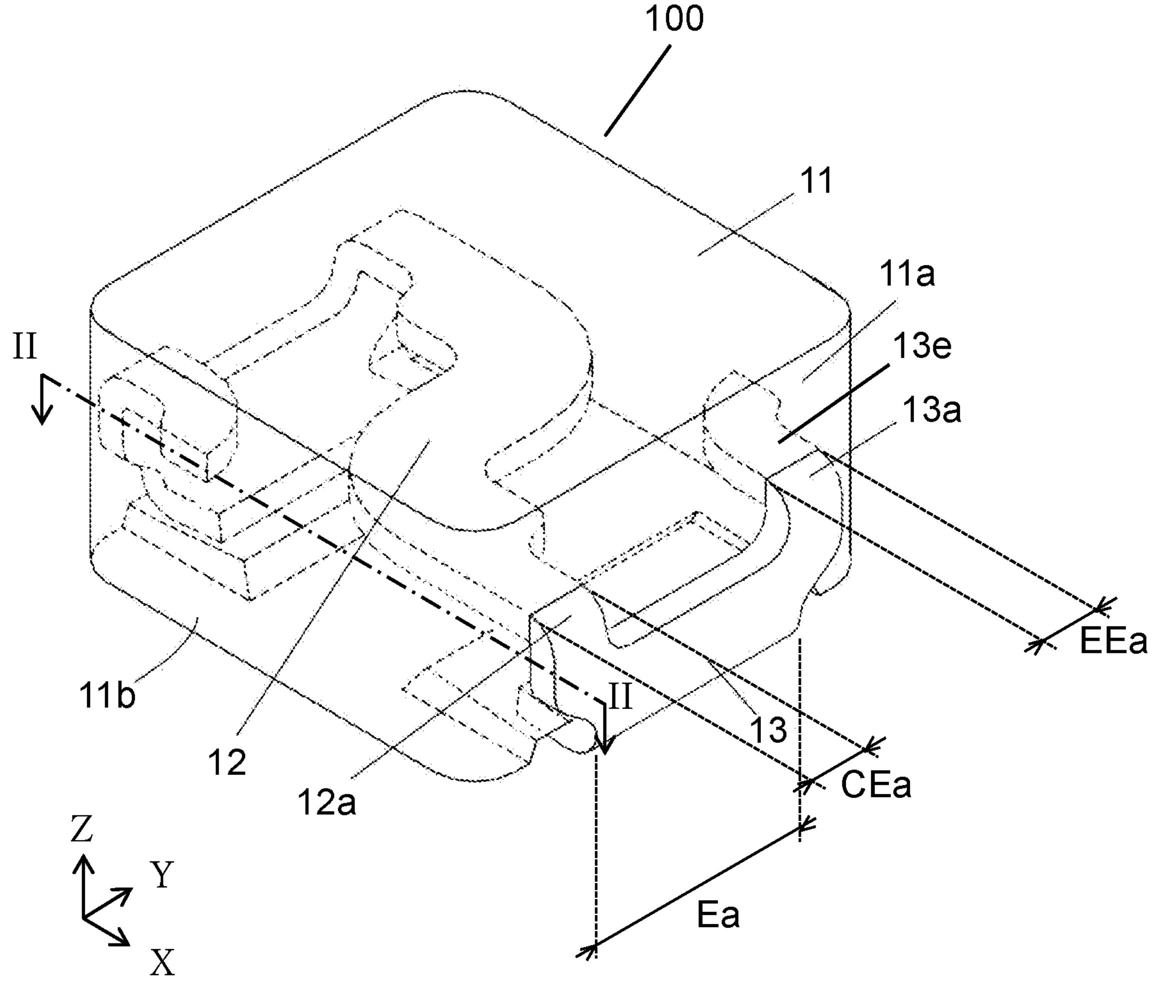
FIG. 1 is a perspective view of an inductor according to an exemplary embodiment of the present disclosure.
Figure 2:
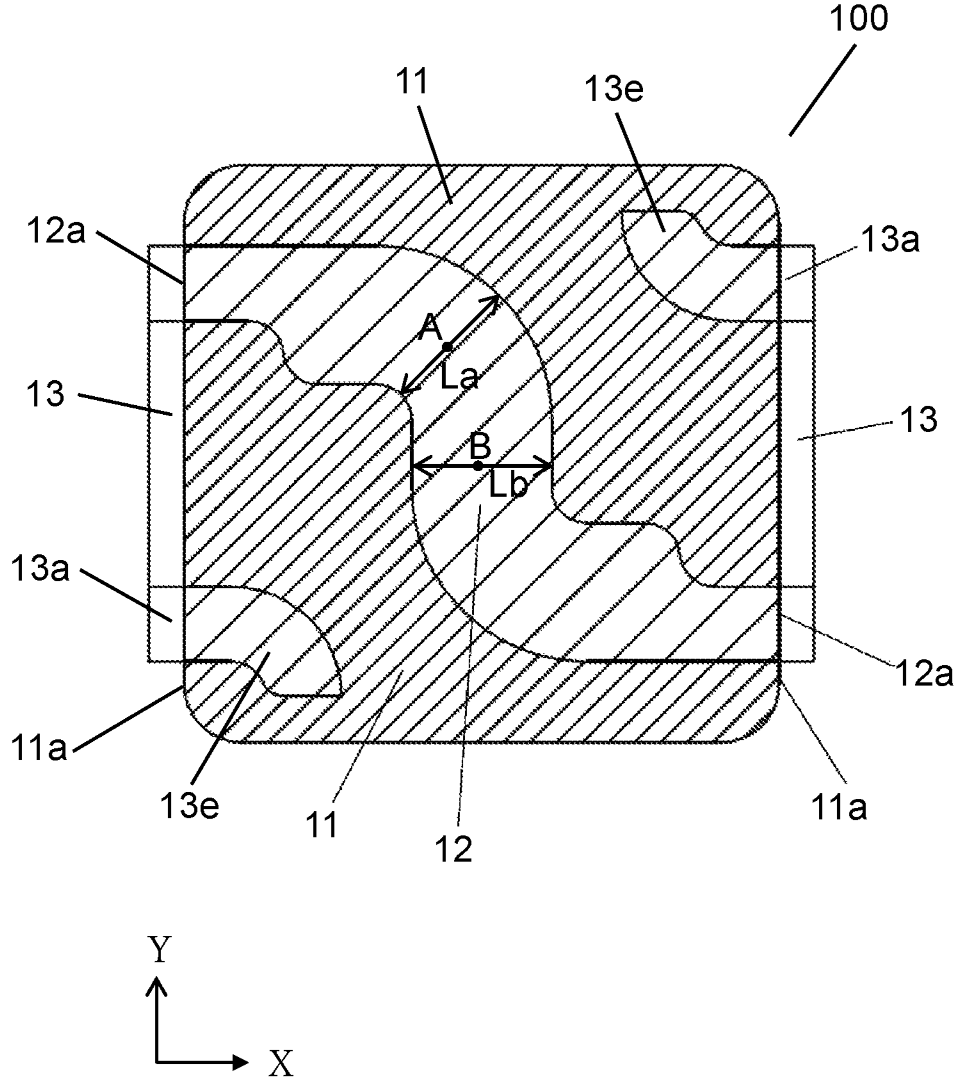
FIG. 2 is a horizontal cross-sectional view of the inductor according to the exemplary embodiment of the present disclosure.

FIG. 1 is a perspective view of inductor 100 according to the exemplary embodiment of the present disclosure, with portions hidden by a magnetic core being indicated by broken lines in FIG. 1. FIG. 2 is a horizontal cross-sectional view of a portion of the inductor in which the coil part is embedded, taken along a plane parallel to bottom surface 11*b* of magnetic core 11 through line II-II illustrated in FIG. 1.

Magnetic core 11 is formed by pressing a composite magnetic material containing a magnetic powder and a binder. Coil part 12 made of a flat conductor is embedded in magnetic core 11. Both end portions 12*a* of coil part 12 protrude from respective, opposite end surfaces 11*a* of magnetic core 11. External electrode 13 is configured by bending each protruding end portion 12*a* of coil part 12.

An outer shape of magnetic core 11 is about 5 mm square and about 3 mm high. Coil part 12 and external electrode 13 are formed by cutting a copper flat plate, and have a thickness of 0.3 mm. Both end portions 12*a* of coil part 12 protrude from respective end surfaces 11*a* of magnetic core 11 to form two external electrodes 13. End portion 13*a* of each external electrode 13 is embedded in end surface 11*a* of magnetic core 11. External electrode 13 protrudes from end surface 11*a* of magnetic core 11 and is bent toward bottom surface 11*b* of magnetic core 11. End portion 13*a* of external electrode 13 is located at a position where external electrode 13 extends along a width direction (Y-axis direction) of end surface 11*a* from a position where coil part 12 protrudes from end surface 11*a*.

XYZ orthogonal coordinates are set in FIGS. 1 to 8. An X axis is an axis parallel to a direction connecting two external electrodes 13 provided on respective end surfaces 11*a* of magnetic core 11, a Y axis is an axis parallel to the direction in which external electrodes 13 extend along end surface 11*a* from the position where coil part 12 protrudes from end surface 11*a*, and a Z axis is an axis orthogonal to both the X axis and the Y axis. Bottom surface 11*b* of magnetic core 11 is parallel to an XY plane. FIG. 2 can also be said to be a cross-sectional view taken along a plane parallel to the XY plane through line II-II illustrated in FIG. 1.

An average width of coil part 12 disposed inside magnetic core 11 is about 1.2 mm, width CEa of end portion 12*a* of coil part 12 protruding from magnetic core 11 is about 0.6 mm, and width Ea of external electrode 13 bent toward bottom surface 11*b* of magnetic core 11 is about 2.5 mm. Here, the average width of coil part 12 disposed inside magnetic core 11 refers to an average of narrowest widths at respective points in a path through which a current flows calculated over the whole path. Here, "the narrowest widths at respective points" indicates, for example, length La at point A on coil part 12 or length Lb at point B on coil part 12 in FIG. 2.

As described above, since width Ea of external electrode 13 is selected to be larger than width CEa of end portion 12*a* of coil part 12 protruding from magnetic core 11, stable solderability can be secured. In addition, width EEa of end portion 13*a* of external electrode 13 is set to about 0.6 mm, the width of a portion where end portion 13*a* of external electrode 13 is embedded in end surface 11*a* of magnetic core 11 (hereinafter, referred to as embedded portion 13*e*) is set to about 0.6 mm, which is the same as width EEa of end portion 13*a* of external electrode 13, and embedded portion 13*e* is bent, thus end portion 13*a* of external electrode 13 and embedded portion 13*e* are hardly removed from magnetic core 11. Although the strength of external electrode 13 tends to be weakened when width CEa of end portion 12*a* of coil part 12 protruding from magnetic core 11 is narrowed, the strength of external electrode 13 can be secured by embedding coil part 12 extending to end portion 12*a* of coil part 12 and embedded portion 13*e* of end portion 13*a* of external electrode 13 in end surface 11*a* of magnetic core 11 as in the configuration of the present disclosure.

As described above, in a case where coil part 12 made of the flat conductor formed by punching a thick copper plate is embedded in magnetic core 11, and end portion 12*a* of coil part 12 protrudes from magnetic core 11 and is bent to form external electrode 13, when an attempt is made to bend coil part 12 at end portion 12*a* of coil part 12, a force is applied to magnetic core 11, and a crack or the like may easily occur. In particular, when the thickness of the flat conductor is 0.2 mm or more, this influence increases. On the other hand, width CEa of end portion 12*a* of coil part 12 protruding from magnetic core 11 is smaller than the average width of coil part 12 embedded in magnetic core 11 in the configuration of the present disclosure, so that even if the thickness of the flat conductor is 0.2 mm or more, the flat conductor can be easily bent when coil part 12 is bent at end portion 12*a* of coil part 12.

Since bending of the flat conductor becomes more difficult as the thickness of the flat conductor increases, it is more preferable that a difference between width CEa of end portion 12*a* of coil part 12 at the portion protruding from magnetic core 11 and the average width of coil part 12 disposed inside magnetic core 11 is more than or equal to the thickness of the flat conductor.

Figure 3:
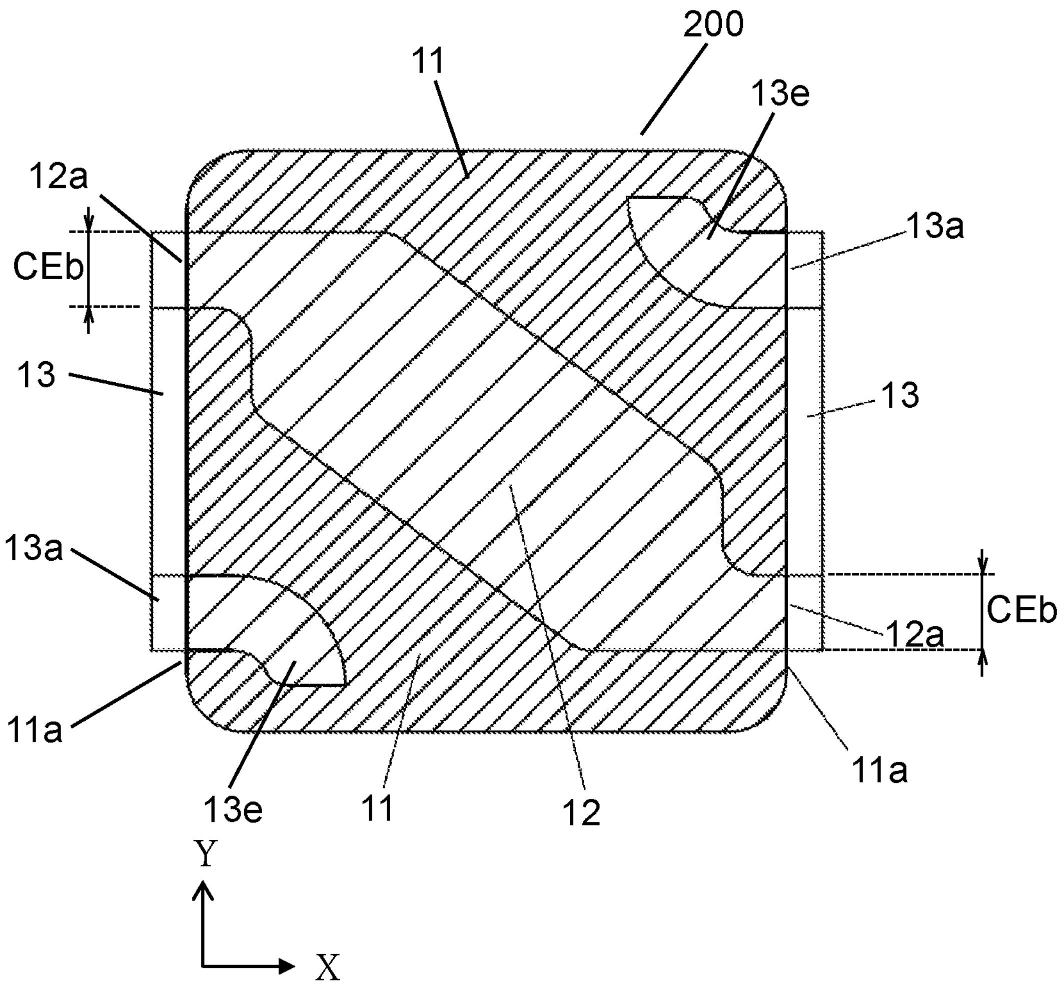
FIG. 3 is a horizontal cross-sectional view of another inductor according to an exemplary embodiment of the present disclosure.

Although coil part 12 in FIGS. 1 and 2 has a key shape, the coil part may be an oblique straight shape extending in a diagonal direction when magnetic core 11 is viewed from the top as illustrated in FIG. 3. Alternatively, coil part 12 may have a U-shape. FIG. 3 is a horizontal cross-sectional view of another inductor 200 according to an exemplary embodiment of the present disclosure, and is a cross-sectional view similar to FIG. 2. In the inductor of FIG. 3, an average width of coil part 12 is about 1.9 mm, and width CEb of end portion 12*a* of coil part 12 protruding from magnetic core 11 is about 0.6 mm. In this way, it is possible to provide a small and highly reliable inductor 200 capable of handling a large current.

Although the size of the inductor of the above described exemplary embodiment is 5 mm square, the effect of the present disclosure is particularly useful for the inductor in which the width of end surface 11*a* of magnetic core 11, from which end portion 12*a* of coil part 12 protrudes, is 3 mm or more and 10 mm or less.

Figure 4:
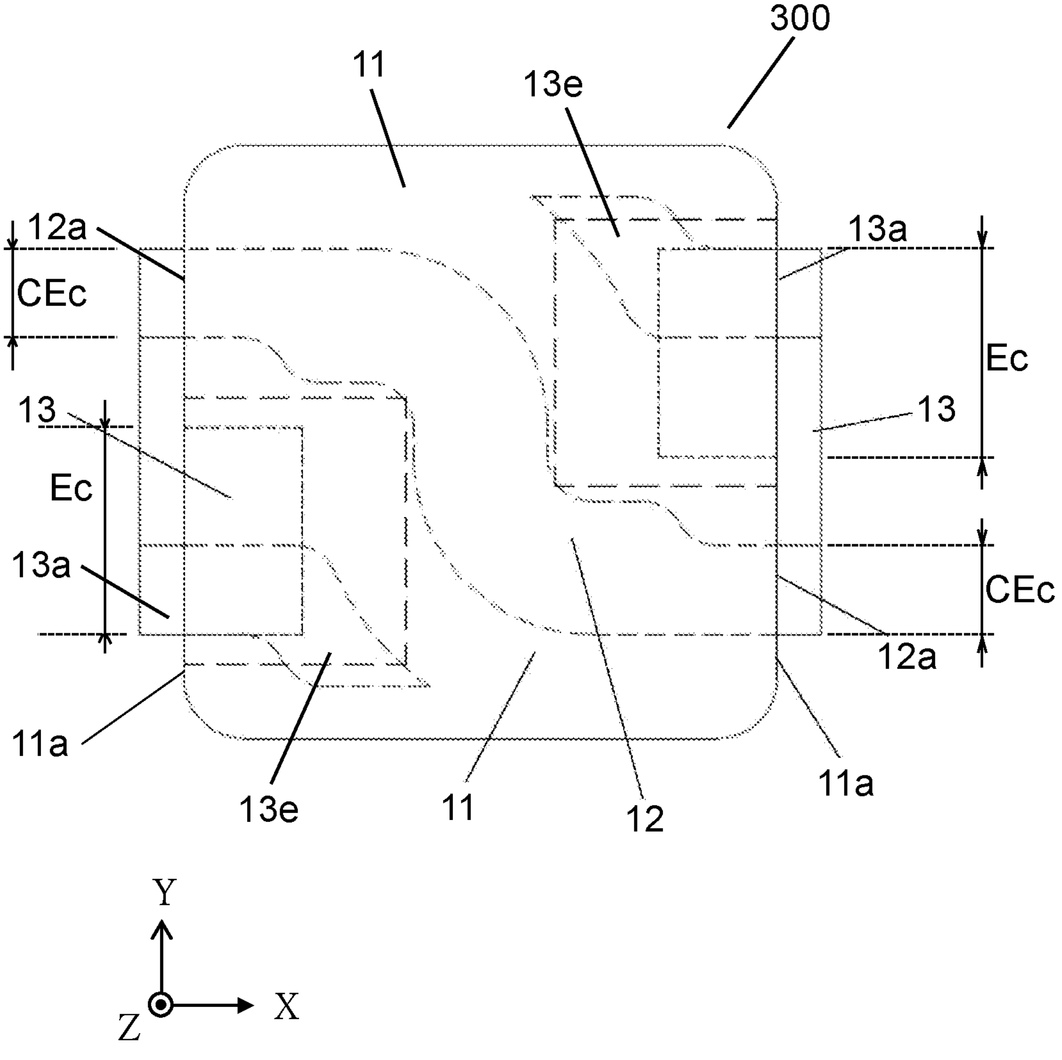
FIG. 4 is a top perspective view of another inductor according to an exemplary embodiment of the present disclosure.

FIG. 4 is a top perspective view of another inductor 300 in an exemplary embodiment of the present disclosure. In FIG. 4, portions hidden by magnetic core 11 are indicated by broken lines.

An outer shape of magnetic core 11 is about 4 mm square and about 2.0 mm high. Coil part 12 and external electrode 13 are formed by cutting a copper flat plate, and has a thickness of 0.2 mm. Both end portions 12*a* of coil part 12 protrude from respective, opposite end surfaces 11*a* of magnetic core 11 to form two external electrodes 13. End portion 13*a* of each external electrode 13 is embedded in end surface 11*a* of magnetic core 11. Other configuration requirements are similar to those in FIG. 1. As described in the exemplary embodiment in FIG. 1, external electrode 13 protrudes from end surface 11*a* of magnetic core 11 and is bent toward bottom surface 11*b* of magnetic core 11.

An average width of coil part 12 is about 0.9 mm, width CEc of end portion 12*a* of coil part 12 protruding from magnetic core 11 is about 0.6 mm, width Ec of external electrode 13 bent toward bottom surface 11*b* of magnetic core 11 is about 1.4 mm, and inductor 300 is configured such that coil part 12 does not overlap external electrode 13 bent toward bottom surface 11*b* of magnetic core 11 in a top view. In this way, since a decrease of an inductance value of inductor 300 due to the cancellation of magnetic fluxes of external electrode 13 and the magnetic fluxes of coil part 12 can be suppressed, it is possible to provide a desired inductance value.

Figure 5:
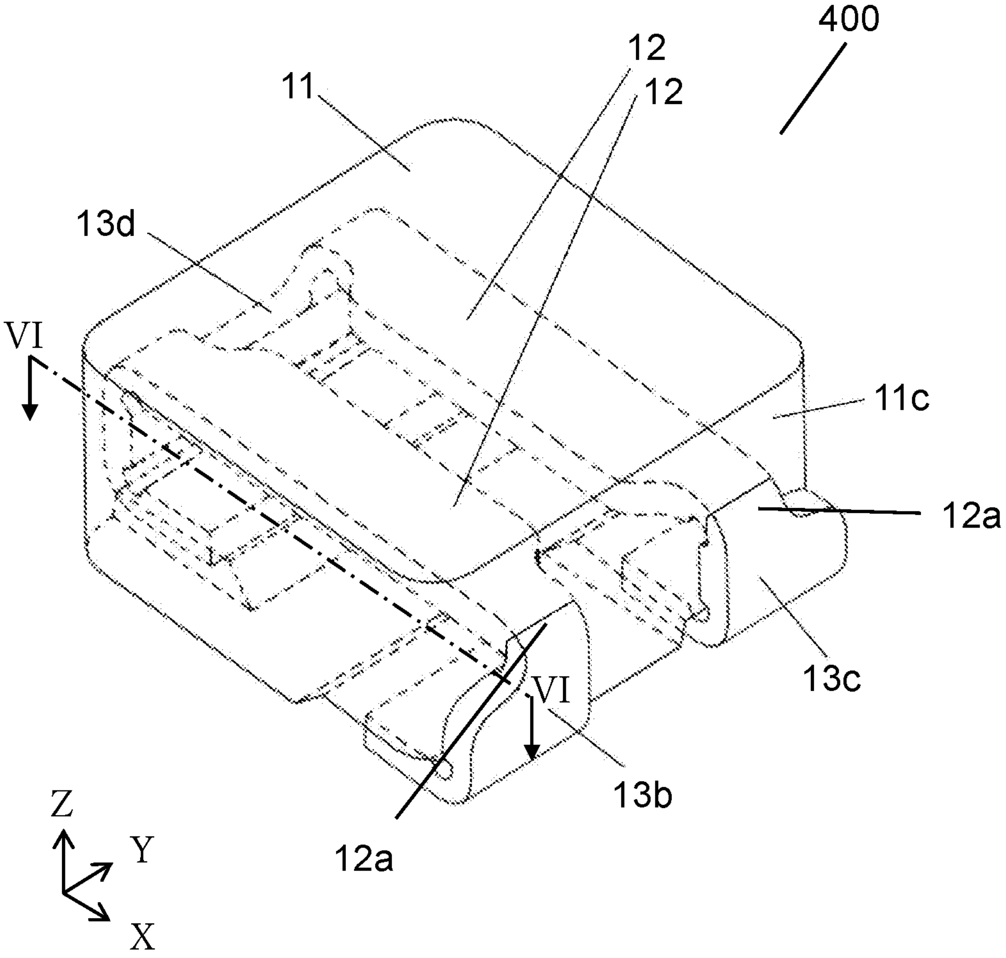
FIG. 5 is a perspective view of another inductor according to an exemplary embodiment of the present disclosure.
Figure 6:
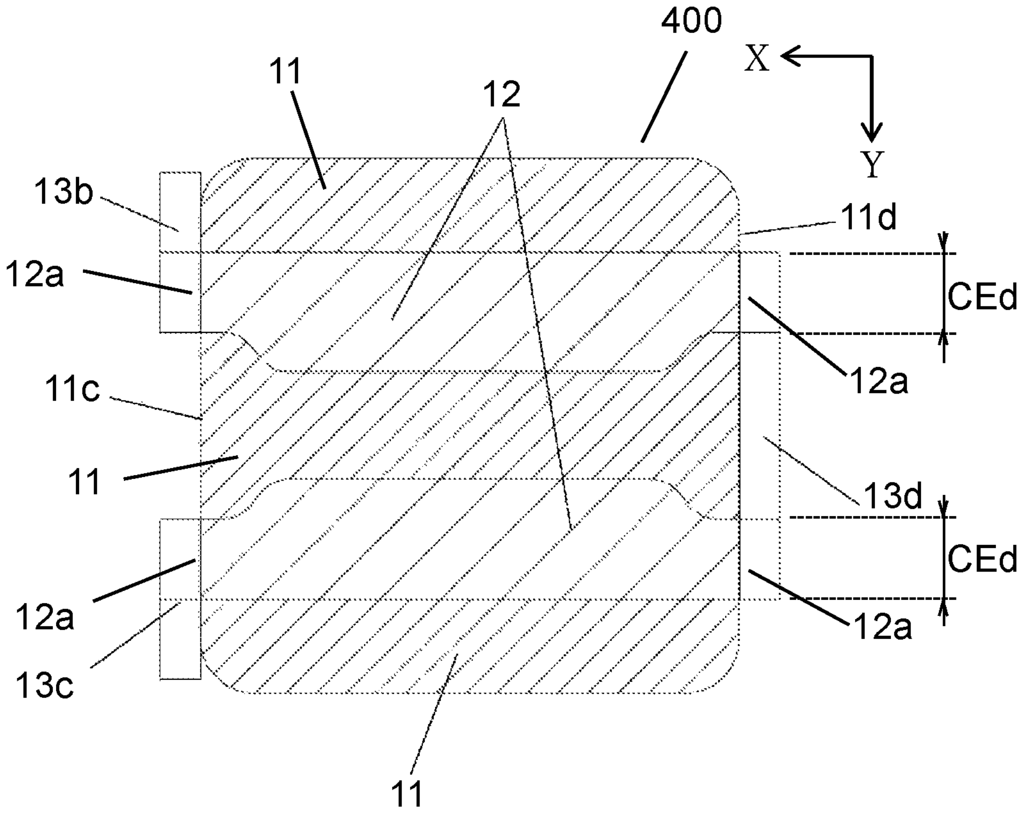
FIG. 6 is a horizontal cross-sectional view of the inductor illustrated in FIG. 5.

FIG. 5 is a perspective view of another inductor 400 according to an exemplary embodiment of the present disclosure, and FIG. 6 is a horizontal cross-sectional view of the inductor. FIG. 6 is the cross-sectional view of inductor 400 taken along a plane parallel to an XY plane through line VI-VI illustrated in FIG. 5. In inductor 400, coil parts 12 have two straight shapes. Magnetic core 11 has both end surfaces 11*c* and 11*d* located on opposite sides. External electrode 13*b* connected to one coil part 12 and external electrode 13*c* connected to other coil part 12 are provided on one end surface 11*c* of magnetic core 11. Other end surface 11*d* of magnetic core 11 is provided with external electrode 13*d* connected to two coil parts 12. Widths CEd of the end portions 12*a* of coil parts 12 protruding from magnetic core 11 are smaller than an average width of coil parts 12 disposed inside magnetic core 11. When inductor 400 is mounted on a printed circuit board (not illustrated), each of external electrode 13*b* and external electrode 13*c* may be soldered to a pad connected to an electric circuit of the printed circuit board, and external electrode 13*d* may be soldered to a dummy pad not connected to any part of the electric circuit. In this way, it is possible to provide the inductor having a high inductance value with external electrode 13*b* and external electrode 13*c* as both ends, and the mountability can also be improved.

Figure 7:
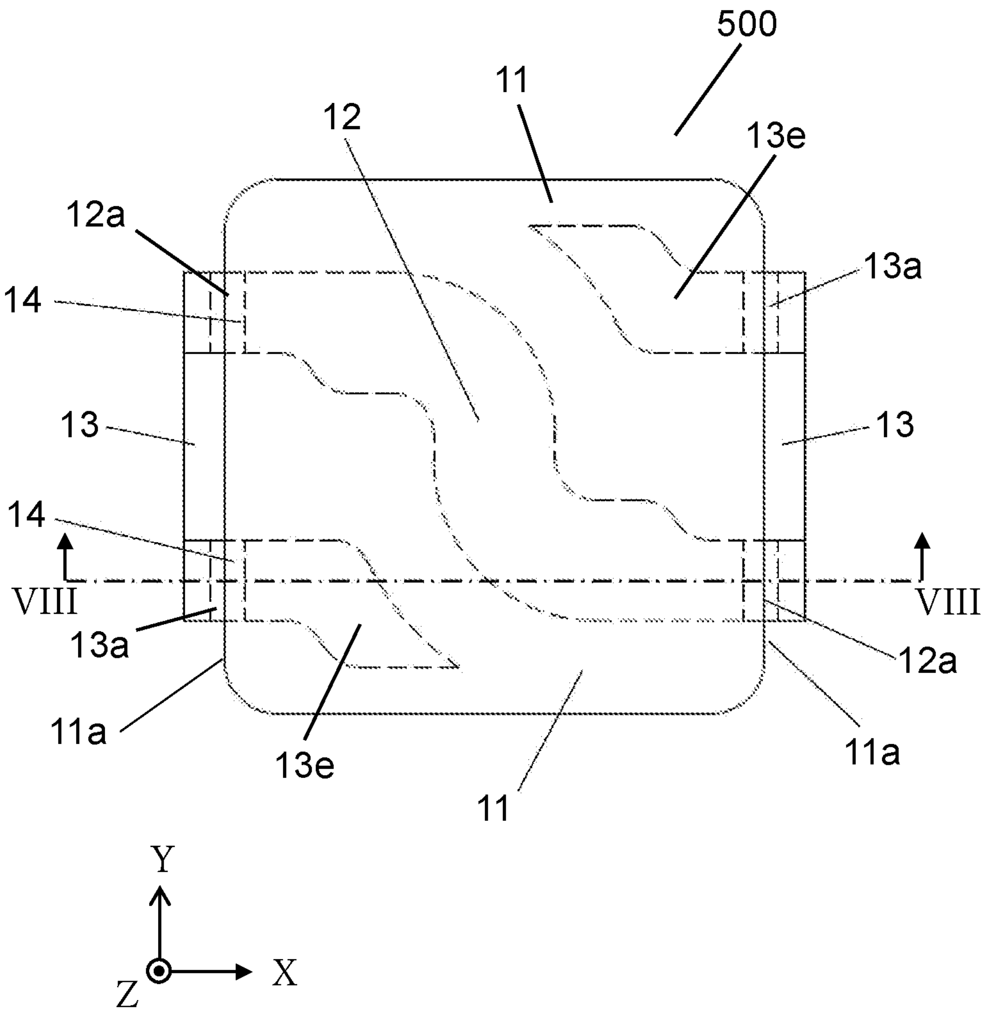
FIG. 7 is a top perspective view of another inductor according to an exemplary embodiment of the present disclosure.
Figure 8:
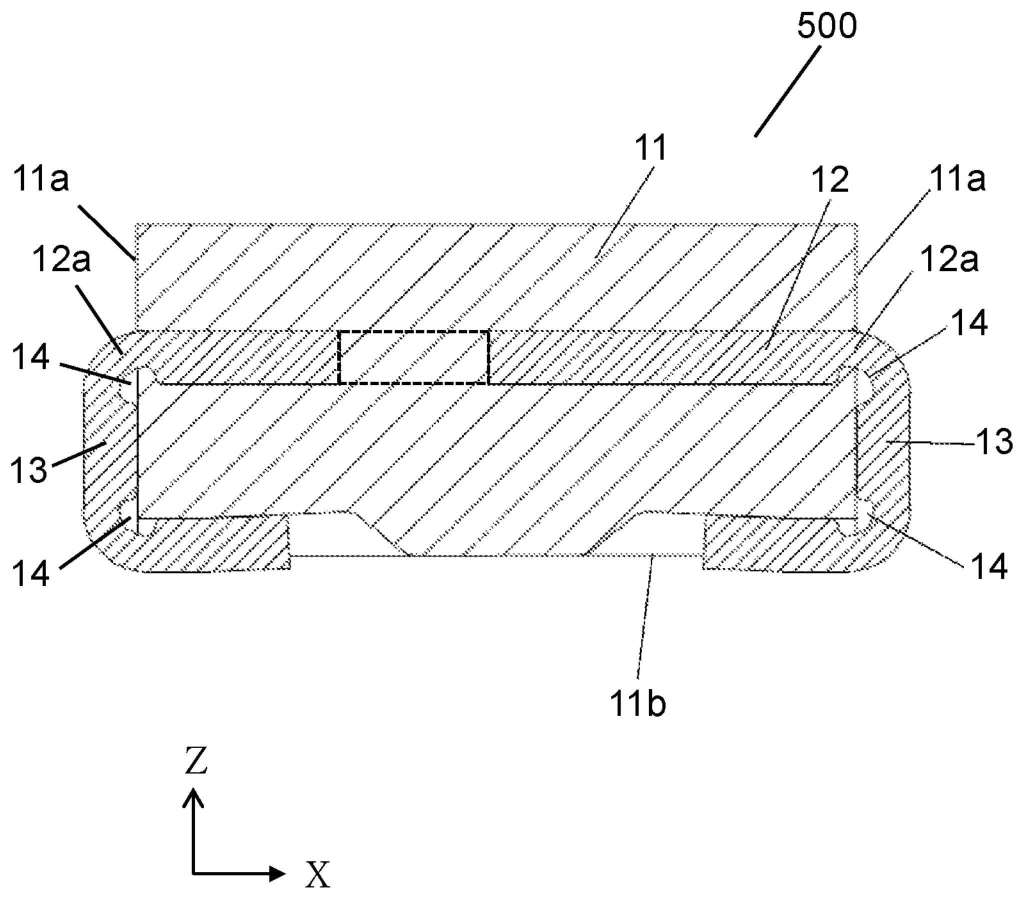
FIG. 8 is a cross-sectional view of the inductor illustrated in FIG. 7.

FIG. 7 is a top perspective view of another inductor 500 according to an exemplary embodiment of the present disclosure, and FIG. 8 is a cross-sectional view taken along line VIII-VIII of inductor 500 in FIG. 7. Inductor 500 is small inductor 500 in which an outer shape of magnetic core 11 is about 4 mm square and about 2.0 mm high. Coil part 12 and external electrode 13 are formed by punching a copper flat plate, and have a thickness of about 0.3 mm. Both end portions 12*a* of coil part 12 embedded in magnetic core 11 protrude from respective, opposite end surfaces 11*a* of magnetic core 11. Each protruding end portion 12*a* is bent toward end surface 11*a* of magnetic core 11 and bottom surface 11*b* of magnetic core 11. Recesses 14 recessed in a concave shape having a depth of about 0.1 mm and a length of about 0.4 mm are provided in bent portions that include end portions 12*a* of coil part 12 and the portions of external electrodes 13 extending from end surfaces 11*a* of magnetic core 11 to bottom surface 11*b* of magnetic core 11. In this way, since a force applied to magnetic core 11 is suppressed when external electrodes 13 are formed by bending, it is possible to achieve the inductor in which the crack does not occur and the DC resistance value is reduced even in the small-sized inductor 500 of 4 mm square or less.

INDUSTRIAL APPLICABILITY

The inductor according to the present disclosure can handle a large current and has a small size and a high reliability, which is industrially useful.

REFERENCE MARKS IN THE DRAWINGS

11: magnetic core
11*a*, 11*c*, 11*d*: end surface
11*b*: bottom surface
12: coil part
12*a*: end portion
13, 13*b*, 13*c*, 13*d*: external electrode
13*a*: end portion
13*e*: embedded portion
14: recess
100, 200, 300, 400, 500: inductor
CEa, CEb, CEc, CEd: width of end portion of coil part
Ea, Ec: width of external electrode
EEa: width of end portion of external electrode

The invention claimed is:

1. An inductor comprising:
a magnetic core formed by pressing a mixture of a powdered magnetic material and a binder;
a coil part disposed inside the magnetic core; and
an external electrode formed by bending an end portion of the coil part, the end portion protruding from the magnetic core,
wherein the coil part and the external electrode are made of a flat conductor, and a width of the end portion protruding from the magnetic core is less than an average width of the coil part disposed inside the magnetic core.

2. The inductor according to claim 1, wherein the width of the external electrode is more than the width of the end portion protruding from the magnetic core.

3. The inductor according to claim 1, wherein a difference between the width of the end portion protruding from the magnetic core and the average width of the coil part disposed inside the magnetic core is more than or equal to a thickness of the flat conductor.

4. The inductor according to claim 1, wherein the coil part does not overlap the external electrode bent toward a bottom surface of the magnetic core in a top view.

5. The inductor according to claim 1, wherein the end portion as a bent portion of the external electrode have concave recesses in a thickness direction.

* * * * *